United States Patent
Boulet et al.

(10) Patent No.: US 9,517,536 B2
(45) Date of Patent: Dec. 13, 2016

(54) DEVICE AND METHOD FOR REPAIRING A DAMAGED ZONE OF AN INTERMEDIATE LAYER OF A MULTILAYER STRUCTURE BY WAY OF DEFORMABLE CORRUGATED RINGS

(71) Applicant: Airbus Operations (SAS), Toulouse (FR)

(72) Inventors: Nicolas Boulet, Colomiers (FR); Richard Combrouze, Touget (FR); Julien Astruc, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 166 days.

(21) Appl. No.: 14/184,170

(22) Filed: Feb. 19, 2014

(65) Prior Publication Data

US 2014/0230213 A1  Aug. 21, 2014

(30) Foreign Application Priority Data

Feb. 21, 2013  (FR) ...................................... 13 51501

(51) Int. Cl.
*B23P 6/00* (2006.01)
*B23P 19/02* (2006.01)
(Continued)

(52) U.S. Cl.
CPC ................ *B23P 6/00* (2013.01); *B29C 73/063* (2013.01); *B29C 73/08* (2013.01); *B29C 73/26* (2013.01);
(Continued)

(58) Field of Classification Search
CPC ........... B64F 5/0081; B23P 6/005; B23P 6/04; B23P 6/00; B23P 2700/01; B23B 43/00; B23B 43/003; B29C 73/08; B29C 73/26;
Y10T 29/49318; Y10T 29/49732; Y10T 29/49734; Y10T 29/49737; Y10T 29/49742; Y10T 29/49748; Y10T 29/49863; Y10T 29/4987; Y10T 29/49872; Y10T 29/49877; Y10T 29/49895; Y10T 29/49911; Y10T 29/49938; Y10T 29/4994; Y10T 29/53657; Y10T 29/53961; Y10T 29/53974; Y10T 29/53978; Y10T 29/53987; B21D 39/08; B21D 39/20
See application file for complete search history.

(56) References Cited

U.S. PATENT DOCUMENTS

| 734,264 A | * | 7/1903 | Hook et al. | ............ | B21D 39/20 |
| | | | | | 72/393 |
| 808,030 A | * | 12/1905 | Faessler | ................ | B21D 39/20 |
| | | | | | 72/393 |

(Continued)

FOREIGN PATENT DOCUMENTS

| DE | 102010060600 B3 * | 3/2012 | ............ B02C 4/305 |
| FR | 2976512 | 12/2012 | |

(Continued)

OTHER PUBLICATIONS

French Search Report, Nov. 7, 2013.

*Primary Examiner* — Essama Omgba
(74) *Attorney, Agent, or Firm* — Greer Burns & Crain, Ltd.

(57) ABSTRACT

A device for repairing a damaged zone in a first cavity, with a first diameter, of an intermediate layer interposed between two layers that have a second cavity with a second diameter smaller than the first diameter. The device includes a stop that forms an abutment at the interface between the first cavity and one of the second cavities, a ring having a deformable corrugated shape, an initial inside diameter, an initial outside diameter smaller than the second diameter, (Continued)

and being positioned in the first cavity, a deformation element having an elastically variable outside diameter initially smaller than the initial inside diameter of the ring, and a tool being able to increase the outside diameter of the deformation element so that it deforms the ring in the first cavity in order to reduce the difference between the first and second diameters.

8 Claims, 2 Drawing Sheets

(51) Int. Cl.
 *B29C 73/26* (2006.01)
 *B29C 73/08* (2006.01)
 *B29C 73/06* (2006.01)
 *B32B 43/00* (2006.01)
(52) U.S. Cl.
 CPC .......... *B32B 43/00* (2013.01); *Y10T 29/49748* (2015.01); *Y10T 29/53657* (2015.01); *Y10T 29/53961* (2015.01); *Y10T 29/53974* (2015.01)

(56) References Cited

U.S. PATENT DOCUMENTS

| | | | | |
|---|---|---|---|---|
| 866,644 | A * | 9/1907 | Green | B21D 39/06 227/152 |
| 924,049 | A * | 6/1909 | Faessler | B21D 39/20 72/393 |
| 943,117 | A * | 12/1909 | Lucas et al. | B21D 39/20 29/523 |
| 1,048,584 | A * | 12/1912 | Rich | B21D 39/20 72/393 |
| 1,062,626 | A * | 5/1913 | Wiedrich | B25B 27/0028 29/235 |
| 1,069,539 | A * | 8/1913 | Evans, Jr. | B25B 27/0028 29/229 |
| 1,124,568 | A * | 1/1915 | Wiedeke | B21D 39/20 72/393 |
| 1,176,232 | A * | 3/1916 | Mauck | B21D 39/20 72/393 |
| 1,301,285 | A * | 4/1919 | Leonard | E21B 43/103 138/173 |
| 2,459,808 | A * | 1/1949 | Geyer | B21D 39/08 72/392 |
| 3,077,916 | A * | 2/1963 | Vaughn | B21D 41/026 72/393 |
| 3,986,383 | A * | 10/1976 | Petteys | B21D 1/08 269/48.1 |
| 4,588,626 | A * | 5/1986 | Cologna | B29C 73/14 156/94 |
| 4,753,101 | A * | 6/1988 | Shultz | B21D 41/02 72/393 |
| 4,820,564 | A * | 4/1989 | Cologna | B29C 73/14 156/98 |
| 4,867,822 | A | 9/1989 | Bannink | |
| 4,961,799 | A * | 10/1990 | Cologna | B29C 73/14 156/250 |
| 5,034,254 | A * | 7/1991 | Cologna | B29C 73/14 156/307.4 |
| 5,110,237 | A * | 5/1992 | Hesse | E02D 13/10 173/128 |
| 5,190,611 | A * | 3/1993 | Cologna | B29C 73/063 156/94 |
| 6,286,213 | B1 * | 9/2001 | Hada | F02M 35/10144 29/507 |
| 6,370,752 | B1 * | 4/2002 | Anderson | B23P 6/005 29/402.09 |
| 7,836,659 | B1 * | 11/2010 | Barnes | E04G 23/02 52/220.6 |
| 8,511,133 | B1 * | 8/2013 | Chen | B21D 41/028 269/43 |
| 8,696,842 | B2 * | 4/2014 | Shigetomi | B29C 73/06 156/98 |
| 8,707,834 | B2 * | 4/2014 | Boulet | B23B 29/03453 407/30 |
| 8,801,424 | B2 * | 8/2014 | Lindner | B21D 39/20 264/296 |
| 8,993,090 | B2 * | 3/2015 | Boulet | B29C 73/14 156/293 |
| 2012/0177878 | A1 * | 7/2012 | Boulet | B29C 73/14 428/131 |
| 2012/0181727 | A1 * | 7/2012 | Lindner | B21D 39/20 264/288.4 |
| 2012/0321398 | A1 | 12/2012 | Boulet et al. | |
| 2013/0025770 | A1 * | 1/2013 | Shigetomi | B29C 73/06 156/98 |
| 2014/0174635 | A1 * | 6/2014 | Shigetomi | B29C 73/06 156/98 |
| 2015/0165507 | A1 * | 6/2015 | Reese | B21D 39/20 72/370.08 |

FOREIGN PATENT DOCUMENTS

| | | | | |
|---|---|---|---|---|
| JP | EP 2006038 A2 * | 12/2008 | ............ | B21D 39/06 |
| WO | WO 2009041427 A1 * | 4/2009 | ............ | B21D 39/06 |
| WO | WO 2013178211 A1 * | 12/2013 | ............ | B21D 39/20 |

\* cited by examiner

DEVICE AND METHOD FOR REPAIRING A DAMAGED ZONE OF AN INTERMEDIATE LAYER OF A MULTILAYER STRUCTURE BY WAY OF DEFORMABLE CORRUGATED RINGS

CROSS-REFERENCES TO RELATED APPLICATIONS

This application claims the benefit of the French patent application No. 20130051501 filed on Feb. 21, 2013, the entire disclosures of which are incorporated herein by way of reference.

BACKGROUND OF THE INVENTION

The invention relates to the repair of damaged zones in intermediate layers of multilayer structures (or assemblies).

A "multilayer structure (or assembly)" is understood here to mean an assembly comprising at least one intermediate layer interposed between, and secured to, at least two other layers.

A cavity (or a through-hole) passes right through some multilayer structures of the abovementioned type, said cavity (or through-hole) having an approximately constant diameter and being able to comprise, in its immediate vicinity, in the region of one of its layers, a zone that is considered to be damaged since it contains at least one defect, for example a crack or a slit. This zone has to be removed and replaced with a new zone in order to avoid the damage from spreading, which could weaken the structure.

In the following text, a "cavity" is understood to mean an empty space passing right through a layer.

When the damaged zone is located around a cavity which is defined in an outer layer, the repair is carried out fairly easily by annular reaming of the damaged zone around the entire periphery of the cavity, followed by filling of the reamed (or removed) zone by means of one or more metal rings having a circular cylindrical shape, and finally securing of a nominal fastener (for example a screw).

When the damaged zone is located around a cavity which is defined in an intermediate layer, the repair is more complex on account of the fact that the damaged zone is interposed between undamaged similar zones. In this case, at least two repair techniques can be implemented.

A first technique consists in carrying out annular reaming of each of the layers of the structure around the entire periphery of their cavity, then either in filling the reamed (or removed) zone by means of one or more metal rings having a circular cylindrical shape, and in securing a nominal fastener, or in securing an oversized fastener.

A second technique consists in carrying out annular reaming only in the intermediate layer around the entire periphery of its cavity, then in filling the reamed (or removed) zone by means of an insert, and finally in securing a nominal or oversized fastener.

This latter insert is generally chosen depending on the profile of the reamed (or removed) zone that has to be filled. It may consist of a plurality of rigid metal parts which are introduced one after another into the reamed zone. However, this type of insert can bring about punctures (or pinched areas) in the reamed zone, and these can cause new defects.

As a variant, the insert may be a one-piece annular insert which is initially contracted at low temperature (for example by being immersed in liquid nitrogen). In this case, it may be produced from a composite material comprising for example minerals or an organic resin mixed with a powder or fibers or else a metal (for example lead). However, mineral-based composite materials are difficult to manufacture and thus expensive, and are poorly suited to the zones to be filled on account of their confinement, and the composite materials based on organic resin have low mechanical strengths and are thus unsuitable in the case in which the structure has to tolerate heavy loads and/or withstand high stresses.

SUMMARY OF THE INVENTION

Since none of the repair techniques described above is entirely satisfactory, the invention thus has in particular the object of proposing a device intended to allow the repair of a damaged and removed zone at the periphery of a first cavity that has a first diameter and is defined in an intermediate layer interposed between at least two layers that have a second cavity with a second diameter (smaller than the first diameter), said second cavity being coaxial with the first cavity, and comprising:
- a stop means that has a surface defining an abutment for an interface between the first cavity and the second cavity in one of the layers that precede it,
- at least one ring that has a deformable corrugated shape (that is to say has at least two inversions of curvature that are modifiable by deformation), has an initial outside diameter smaller than the second diameter and an initial inside diameter, and is intended to be positioned in the first cavity,
- a deformation means that has a central cavity and an elastically variable outside diameter initially smaller than the initial inside diameter of each ring, and
- a tool that is designed to be introduced into the central cavity and to increase the outside diameter of the deformation means in order to deform the ring in the first cavity by increasing its initial outside diameter (by flattening its corrugations) so as to reduce the difference between the first and second diameters.

Since the reamed zone is filled by means of one or more one-piece rings, there is no longer a risk of inducing punctures therein. Furthermore, since each ring can now be produced in a very strong metal material, the structure can continue to tolerate heavy loads and/or withstand high stresses.

The repair device may have other features which can be taken separately or in combination, in particular:
- its tool may comprise a rod having, firstly, a conical part having a diameter that increases up to a maximum value which is very slightly smaller than the second diameter, and, secondly, a circular cylindrical part that extends the conical part and has a diameter equal to the abovementioned maximum value;
- it may comprise at least two concentric rings having a deformable corrugated shape, said rings being able to be positioned together in the first cavity;
- the rings may be pre-assembled together by the introduction, into a ring having a larger initial inside diameter, of a ring having an initial outside diameter very slightly smaller than this larger initial inside diameter;
- its deformation means may comprise at least two elements that have mutually complementary circular semi-cylindrical shapes, jointly define the central cavity and each have on an outer face (opposite the central cavity) at least one groove designed to accommodate a part of an elastic ring which is adapted to the elastic deformation of the outside diameter of the deformation means;

its stop means may comprise, firstly, a head wider than the second diameter and intended to be pressed against an outer face of one of the layers, and, secondly, a body having a circular cylindrical shape, a diameter slightly smaller than the second diameter and a height approximately equal to the thickness of the abovementioned layer in the region of its second cavity.

The invention also proposes a method, intended to allow the repair of a damaged and removed zone at the periphery of a first cavity that has a first diameter and is defined in an intermediate layer interposed between at least two layers that have a second cavity with a second diameter (smaller than the first diameter), said second cavity being coaxial with the first cavity, and comprising the following steps of:
  defining an abutment at the interface between the first cavity and the second cavity in one of the layers that precede it,
  installing in the first cavity at least one ring that has a deformable corrugated shape, an initial inside diameter and an initial outside diameter smaller than the second diameter,
  introducing into the first cavity, by means of a tool, a deformation means that has an elastically variable outside diameter initially smaller than the initial inside diameter of each ring, and
  increasing the outside diameter of the deformation means by way of the tool in order to deform each ring in the first cavity by increasing its initial outside diameter (by flattening its corrugations) so as to reduce the difference between the first and second diameters.

The repair method may have other features which can be taken separately or in combination, in particular:
  at least two concentric rings having a deformable corrugated shape may be positioned together in the first cavity during the installing step;
  the installing, introducing and increasing steps may be repeated as many times as necessary with new rings in order to completely eliminate the initial difference between the first and second diameters;
  the tool may be modified during each repetition of the introducing step such that it causes a deformation of the outside diameter of the deformation means less than that of the preceding iteration.

The invention is particularly well suited, although the invention is not limited thereto, to the repair of a multilayer structure of an aircraft, of a boat, of a submarine, of a petrochemical installation, or of a nuclear installation.

BRIEF DESCRIPTION OF THE DRAWINGS

Other features and advantages of the invention will become apparent from examining the following detailed description and the appended drawings, in which.

The appended drawings may be used not only to supplement the invention, but also to contribute to defining it, as necessary.

DETAILED DESCRIPTION OF THE PREFERRED EMBODIMENTS

The invention has in particular the objective of proposing a repair device D and an associated repair method, which are intended to allow the repair of a damaged and removed zone at the periphery of a first cavity T1 defined in an intermediate layer CI of a multilayer structure (or assembly) SC.

In the following text, by way of illustrative example, the multilayer structure SC is considered to be intended to be installed in an aircraft, for example an airplane. However, the invention is not limited to this application. Specifically, it relates to any system having at least one multilayer structure having at least one intermediate layer interposed between at least two other layers. Thus, it also relates in particular to boats, submarines, petrochemical installations and nuclear installations (or equipment).

Furthermore, in the following text, by way of illustrative example, the multilayer structure SC is considered to comprise an intermediate layer CI interposed between two other layers CE1 and CE2, called first outer layer CE1 and second outer layer CE2, respectively, below. However, the multilayer structure SC may comprise more than two other layers (for example three or four, or even more) in addition to the intermediate layer CI.

Figure 1:
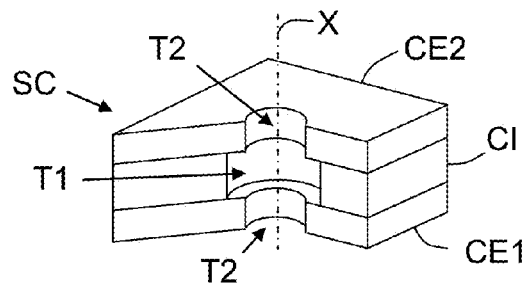
FIG. 1 schematically illustrates an exploded perspective view of a part of a multilayer structure having an intermediate layer provided with a damaged and reamed zone, FIG. 2 schematically illustrates a perspective view of the various constituents of one exemplary embodiment of a repair device according to the invention, FIG. 3 schematically illustrates a perspective view of an example of a ring of a repair device according to the invention, before it is inserted into and deformed in the cavity of a damaged intermediate layer of a multilayer structure, FIG. 4 schematically illustrates a perspective and sectional view of that part of the multilayer structure from FIG. 1 that is coupled to the repair device from FIG. 2 with a view to filling the damaged and reamed zone of its intermediate layer, and FIG. 5 schematically illustrates an exploded perspective view of the part of the multilayer structure from FIG. 1 after the damaged and reamed zone has been filled by way of a repair device according to the invention.

A multilayer structure SC comprising an intermediate layer CI interposed between a first outer layer CE1 and a second outer layer CE2 is schematically illustrated in FIG. 1. By way of nonlimiting example, these different layers CI, CE1 and CE2 may be produced from materials such as aluminum 7175T73 or 2024T42, or titanium TA6V, or from composite materials.

The intermediate layer CI comprises a first cavity T1 having a first diameter d1. It is important to note that this first cavity T1 previously had a second diameter d2 smaller than d1, and this was brought to the value d1 following the annular reaming of a damaged zone around its entire periphery (following the detection of at least one defect). In other words, FIG. 1 illustrates the multilayer structure SC after a damaged zone has been removed at the periphery of its first cavity T1 (and thus before a repair according to the invention has been carried out).

Each outer layer CE1 or CE2 comprises a second cavity T2 that has the second diameter d2 and is coaxial with the first cavity T1. The centering axis of the first cavity T1 and second cavities T2 is depicted by the letter X in FIG. 1.

It will be understood that, prior to the reaming operation carried out in the single intermediate layer CI, a cavity (or through-hole) more or less constantly having the second diameter d2 passed right through the multilayer structure SC.

As indicated above, the invention proposes in particular the use of a repair device D for repairing the multilayer structure SC, and more specifically its intermediate layer CI.

Figure 2:
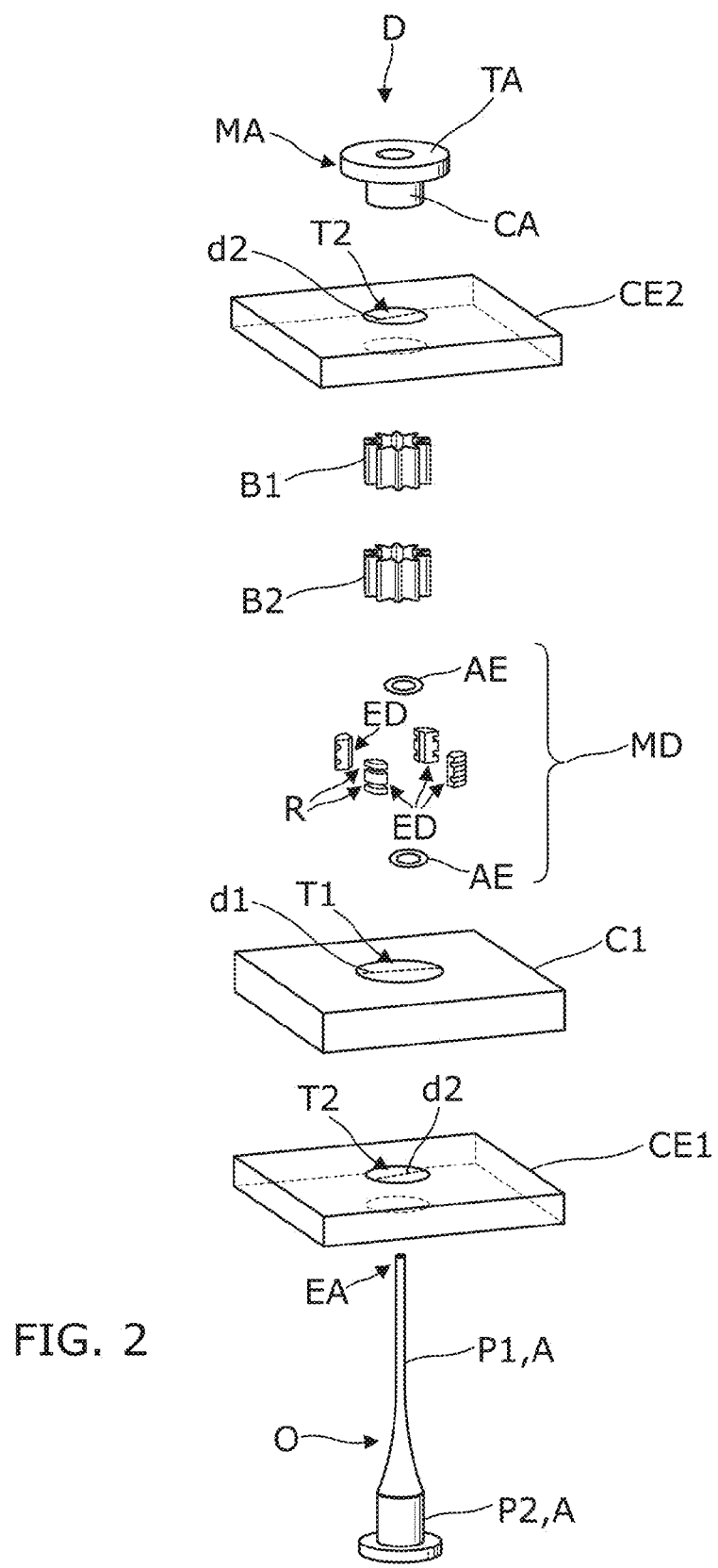

An exemplary embodiment of a repair device D according to the invention is schematically illustrated in FIG. 2. As illustrated, such a (repair) device D comprises a stop means MA, at least one ring Bi, a deformation means MD and a tool O.

The stop means MA has a surface that defines an abutment for an interface between the first cavity T1 and the second cavity T2 of one of the layers of the multilayer structure SC. For example, and as illustrated in FIG. 4, this interface may be located between the intermediate layer CI and the second outer layer CE2.

Figure 4:
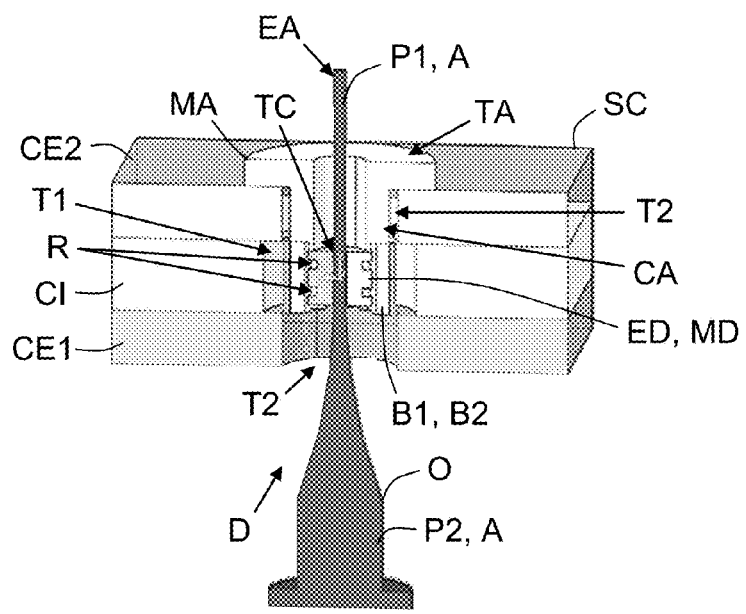

As illustrated in FIGS. 2 and 4, this stop means MA may, for example, be arranged in the form of a pin comprising a head TA extended by a body CA. The head TA is wider than the second diameter d2 so as to be able to be pressed (and preferably held tightly) against an outer face of the second outer layer CE2.

The body CA has a circular cylindrical shape, an outside diameter slightly smaller than the second diameter d2, so as to be able to be introduced into the second cavity T2 (in this case of the second outer layer CE2), and a height approximately equal to the thickness, in this case, of the second outer layer CE2 in the region of its second cavity T2. It will be understood from FIG. 4 that this stop means MA defines a kind of stopper that at least partially fills the second cavity T2 of the second outer layer CE2, and that the terminal part of its body CA (opposite its head TA) is terminated by a surface which defines an abutment for each ring Bi at the interface between the first cavity T1 and the second cavity T2 of the second outer layer CE2.

It will be noted that the head TA and the body CA of the stop means MA advantageously comprise a central cavity, the usefulness of which will become apparent further below.

Each ring Bi has a deformable corrugated shape, and an initial inside diameter and an initial outside diameter smaller than the second diameter d2, so as to be able to be positioned in the first cavity T1 (in this case via the second cavity T2 of the first outer layer CE1), in abutment against the terminal part of the body CA of the stop means MA.

A "deformable corrugated shape" is understood here to mean a curvilinear shape having (at least two) curvature inversions which can be modified, or even eliminated, by deformation.

It will be noted that a plurality of (at least two) concentric rings Bi having a deformable corrugated shape can be positioned together in the first cavity T1. In this case, the rings Bi are preferably pre-assembled together, for example by the introduction, into the ring which has the largest initial inside diameter, of the ring which has an initial outside diameter very slightly smaller than this largest initial inside diameter. An example of such an assembly is illustrated in a nonlimiting manner in FIGS. 2 and 4. In this example, two concentric rings B1 and B2 (i=1 or 2) are assembled before being simultaneously positioned together in the first cavity T1. When a set of concentric rings Bi is used, the initial outside diameter of the ring which is housed in another ring is equal, by a very slightly smaller value, to the initial inside diameter of this other ring. The use of sets of concentric rings is particularly advantageous when the structure SC is intended to tolerate heavy loads and/or withstand high stresses.

Figure 3:
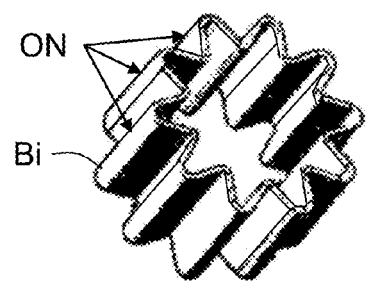

An exemplary embodiment of a ring Bi is schematically illustrated in FIG. 3. In this example, the ring Bi has the general shape of a star having 10 arms (or corrugations) ON. However, it may have a number of arms (or corrugations) ON greater or less than 10.

It will be noted that a device D may have a plurality of rings Bi, respectively having different outside diameters, more specifically decreasing outside diameters. The advantage of this option will be understood further below.

Each ring Bi may, for example, be produced from an extruded metal material, for example steel or aluminum.

The deformation means MD has a central cavity TC (see FIG. 4) and an outside diameter which is elastically variable and initially smaller than the initial inside diameter of each ring Bi (intended to be positioned in the first cavity T1), so as to be able to be introduced into the latter by means of the tool O.

Thus, by progressively increasing the outside diameter of such a deformation means MD, each ring Bi positioned in the first cavity T1 will be deformed progressively until its wall is squashed against the inside wall delimiting this first cavity T1 (by flattening of its corrugations ON) and matches its shape (i.e., a substantially circular cylindrical shape).

The final outside diameter (after complete deformation) of the ring Bi which is outermost within a set is greater than the initial outside diameter (before deformation) of this same ring Bi, on account of the existence of corrugations on its material wall. The dimensions of the first ring B1 used (the one which is intended to be in contact with the wall initially delimiting the first cavity T1) and of its corrugations are thus determined depending on the value of the first diameter d1, and more specifically such that after complete deformation of this first ring B1, its final outside diameter is substantially equal to the initial inside diameter of the first cavity T1. Furthermore, the height of each ring Bi is preferably slightly smaller than the thickness of the intermediate layer CI in the region of its first cavity T1.

For example, the deformation means MD may comprise at least two elements ED that have complementary circular semi-cylindrical forms, jointly define the central cavity TC and each have, on an outer face opposite the central cavity TC, at least one groove R designed to house a part of an elastic ring AE adapted to the elastic deformation of its outside diameter. This is the case in particular in the non-limiting example illustrated in FIG. 2. More specifically, in the example illustrated, the deformation means MD comprises four elements ED, each defining a quarter of a circular cylinder. Furthermore, in this example illustrated, each element ED comprises two grooves R, each intended to receive a part of an elastic ring AE (for example made of rubber, possibly synthetic rubber). However, in variant embodiments, the deformation means MD may have a number of elements ED greater or less than four (for example two, three, five or six) and/or a number of grooves R greater or less than two (for example one or three).

It will be understood that, before being introduced into each ring Bi positioned in the first cavity T1, the elements ED are grouped together so as to define a circular cylinder, and are then secured together by means of each elastic ring AE positioned in a groove R.

Each element ED may, for example, be produced from a metal material, for example Inconel 625 or 15.5PH steel.

It will be noted that, in a variant embodiment, the deformation means MD may be of the single-piece type. In this case, it can be produced in the form of a circular cylinder made of rubber (possibly synthetic rubber) and provided with a central through-cavity TC, if the material from which the rings Bi are made allows this.

The tool O is arranged so as to be introduced into the central cavity TC of the deformation means MD in order to increase the outside diameter of the latter (MD) so that it deforms each ring Bi positioned in the first cavity T1 (by flattening of its corrugations ON) with a view to reducing the difference between the first diameter d1 and second diameter d2.

It will be noted that the implantation of a ring Bi (or of a set of concentric rings Bi) into a first cavity T1 may not suffice to fully fill the difference between the first diameter d1 and second diameter d2. Consequently, it is possible to repeat the implantation of ring(s) Bi into a first cavity T1 as many times as necessary in order to completely eliminate the initial difference that exists between the first diameter d1 and second diameter d2, using each time at least one ring Bi that is adapted to the current diameter of the first cavity T1 and thus has an outside diameter smaller than that of the previously implanted ring Bi'.

For example, and as illustrated in a nonlimiting manner in FIGS. 2 and 4, the tool O may comprise a rod A having a conical part P1 that is extended by a circular cylindrical part P2. The conical part P1 has a diameter that increases up to a maximum value which is very slightly smaller than the second diameter d2, and the circular cylindrical part P2 has a diameter equal to this maximum value.

As illustrated in FIG. 4, with such a tool O, after the body CA of the stop means MA has been positioned in the second cavity T2, in this case, of the second outer layer CE2 and a set of rings Bi has been positioned in the first cavity T1 of the intermediate layer CI, the end EA of the rod A is introduced into the central cavity TC of the deformation means MD. Next, this end EA is introduced (in this case upwardly) into the structure SC via the second cavity T2, in this case, of the first outer layer CE1 until the deformation means MD abuts against the terminal part of the body CA of the stop means MA. At this stage, the end EA of the rod A can pass (as illustrated in FIG. 4) through the body CA and possibly the head TA of the stop means MA via their central cavity. Next, the tool O continues to be pushed upwards in order that the conical part P1 and then the circular cylindrical part P2 progressively increases the outside diameter of the deformation means MD and thus induces a progressive deformation of each ring Bi positioned in the first cavity T1 (by flattening of its corrugations ON) and thus at least partial filling of the latter (T1). Next, the tool O is pulled (in this case downwardly) in order to progressively remove it from the structure SC. This causes a progressive decrease in the outside diameter of the deformation means MD down to its rest value (without stress), and thus makes it possible to remove it from the structure SC when it is coupled to the end EA of the tool O again.

If the zone initially removed from the first cavity T1 has not been completely filled, a new set of rings Bi is positioned in the first cavity T1 of the intermediate layer CI, and then the end EA of the rod A is introduced into the central cavity TC of the deformation means MD, preferably after this rod A has been reamed a little in order that it causes a maximum increase in the outside diameter of the deformation means MD less than that which it afforded previously. As a variant, use can be made of another tool O having smaller dimensions than the previous tool. Next, the end EA is introduced into the structure SC, as indicated above, in order to implant the new set of rings Bi. These operations can then be repeated.

Figure 5:
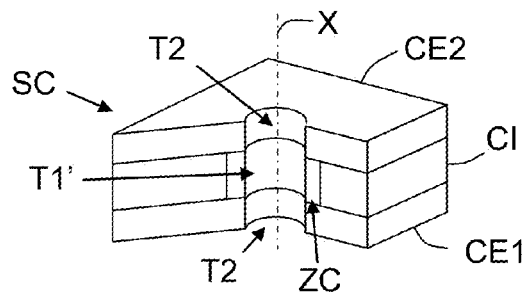

FIG. 5 schematically illustrates the part of the structure SC from FIG. 1 after the damaged and reamed zone ZC of its intermediate layer CI has been filled by means of the device D. As can be seen, the first cavity, initially referenced T1 and now referenced T1', now has a diameter equal to the second diameter d2 of the first outer layer CE1 and second outer layer CE2.

It will be noted that the final ring Bi implanted, and also the second cavity T2 of the second outer layer CE2, can then optionally be very slightly reamed before proceeding with the installation of a fastener (for example a screw). The structure SC is thus repaired and can be used again for its intended purpose.

It is important to note that the invention can also be considered from the perspective of a repair method, which can be implemented in particular using a repair device D of the type presented above. Since the functions afforded by the implementation of the method according to the invention are identical to those afforded by the repair device D presented above, only the combination of main functions afforded by the method is presented below.

This repair method comprises the following steps of:
defining an abutment at the interface between the first cavity T1 and the second cavity T2 in one (CE2) of the layers that precede it,
installing in the first cavity T1 at least one ring Bi that has a deformable corrugated shape (that is to say has at least two inversions of curvature that are modifiable by deformation), an initial inside diameter and an initial outside diameter smaller than the second diameter d2,
introducing into the first cavity T1, by means of a tool O, a deformation means MD that has an elastically variable outside diameter initially smaller than the inside diameter of each ring Bi, and
increasing the outside diameter of the deformation means MD by way of the tool O in order to deform the ring Bi in the first cavity T1 by increasing its initial outside diameter (by flattening its corrugations ON) so as to reduce the difference between the first diameter d1 and second diameter d2.

It may be noted that the installing, introducing and increasing steps can be repeated as many times as necessary with new rings Bi in order to completely eliminate the initial difference that exists between the first diameter d1 and second diameter d2.

The invention is not limited to the embodiments of the repair device and repair method described, only by way of example, above, but encompasses all of the obvious variants that are conceivable to a person skilled in the art within the exclusive scope of the following claims.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for repairing a damaged and removed zone at the periphery of a first cavity that has a first diameter and is defined in an intermediate layer interposed between at least two layers that have a second cavity with a second diameter smaller than said first diameter, said second cavity being coaxial with said first cavity, said device comprising:
a stop means having a surface defining an abutment for an interface between said first cavity and said second cavity in one of said layers,
at least one ring having a deformable corrugated shape, an initial inside diameter, and an initial outside diameter smaller than said second diameter, and wherein said at least one ring is configured and arranged to be positioned in said first cavity, a deformation means having a central cavity and an elastically variable outside diameter initially smaller than said initial inside diameter of said ring, and a tool designed to be introduced into said central cavity and to increase the outside diameter of said deformation means in order to deform said ring in said first cavity by increasing its initial outside diameter so as to reduce the difference between said first and second diameters, wherein said stop means comprises:

a head wider than said second diameter and intended to be pressed against an outer face of one of said layers, a body having a circular cylindrical shape, a diameter slightly smaller than said second diameter and a height approximately equal to a thickness of said layer in the region of its second cavity, and a stop means cavity extending through both said head and said body of said stop means, wherein said stop means cavity is configured and arranged to slidably receive a portion of said tool therein.

2. A method for repairing a damaged and removed zone at the periphery of a first cavity that has a first diameter and is defined in an intermediate layer interposed between at least two layers that have a second cavity with a second diameter smaller than said first diameter, said second cavity being coaxial with said first cavity, comprising the steps:

defining an abutment at an interface between said first cavity and said second cavity in one of said layers, installing in said first cavity at least one ring that has a deformable corrugated shape, an initial inside diameter, and an initial outside diameter smaller than said second diameter, introducing into said first cavity, by means of a tool, a deformation means that has an elastically variable outside diameter in which all portions thereof are initially smaller than an inside diameter of said ring, and increasing the outside diameter of said deformation means by way of said tool in order to deform said ring in said first cavity by increasing its initial outside diameter so as to reduce the difference between said first and second diameters, wherein:

said at least two layers comprises two outer layers, with one of said outer layers being on each side of said intermediate layer; and said method further comprises positioning a stop means upon one of said outer layers, thereby positioning an abutment surface of the stop means at an interface between said first cavity of said intermediate layer and said second cavity of one of said outer layers.

3. The method according to claim 2, wherein at least two concentric rings having a deformable corrugated shape are positioned together in said first cavity during said installing step.

4. The method according to claim 2, wherein said installing, introducing and increasing steps are repeated as many times as necessary with new rings in order to completely eliminate the initial difference between said first and second diameters.

5. The method according to claim 4, wherein said tool is modified during each repetition of said introducing step such that it causes a deformation of said outside diameter of the deformation means less than that of the preceding iteration.

6. The method of claim 2, wherein said introducing step includes introducing said deformation means into said first cavity until said deformation means abuts against the abutment surface of said stop means.

7. A method of repairing a multilayer structure of an aircraft comprising a damaged and removed zone at the periphery of a first cavity that has a first diameter and is defined in an intermediate layer interposed between at least two outer layers that have a second cavity with a second diameter smaller than said first diameter, said second cavity being coaxial with said first cavity, the method comprising steps of:

using a repairing device comprising:

a stop means having a surface for defining an abutment for an interface between said first cavity and said second cavity in one of said layers, at least one ring having a deformable corrugated shape, an initial inside diameter, an initial outside diameter smaller than said second diameter, and being intended to be positioned in said first cavity, a deformation means having a central cavity and an elastically variable outside diameter initially smaller than said initial inside diameter of said ring, and a tool being designed to be introduced into said central cavity and to increase the outside diameter of said deformation means in order to deform said ring in said first cavity by increasing its initial outside diameter so as to reduce the difference between said first and second diameters, and positioning said stop means upon one of said outer layers, thereby defining the abutment at an interface between said first cavity and said second cavity in one of said layers, installing in said first cavity at least one ring that has a deformable corrugated shape, an initial inside diameter, and an initial outside diameter smaller than said second diameter, introducing into said first cavity, by means of said tool, said deformation means, until said deformation means abuts against the abutment surface of said stop means, and increasing the outside diameter of said deformation means by way of said tool in order to deform said ring in said first cavity by increasing its initial outside diameter so as to reduce the difference between said first and second diameters.

8. The method of claim 7, wherein said introducing step includes sliding a portion of the tool through a stop means cavity that is formed within and extends completely through the stop means.

* * * * *